United States Patent Office 3,133,883
Patented May 19, 1964

3,133,883
STEAM KETTLE MANUFACTURE OF GREASE WITH UREIDO THICKENERS
Wilbur L. Hayne, Jr., Hammond, and Stephen J. Zajac, Whiting, Ind., assignors to Standard Oil Company, Chicago, Ill., a corporation of Indiana
No Drawing. Filed Aug. 28, 1961, Ser. No. 134,080
6 Claims. (Cl. 252—51.5)

This invention pertains to improvements in the preparation of lubricating greases and more particularly is directed to the manufacture of greases prepared from certain ureido compound thickeners at steam kettle temperatures.

In the manufacture of lubricating greases in which a lubricating oil is thickened by a certain ureido compound, as described in co-pending application Serial No. 750,050, now Patent No. 3,015,625, filed July 21, 1958, by R. Rosscup and H. Liehe, it is the usual practice to mix the ureido thickener with the lubricating oil at a temperature of about 200° F., and the mixture then heated to and maintained at 390–400° F. for 30 to 45 minutes, then cooled to about 200° F. and finally milled.

Since many grease manufacturers are not squipped with kettles suitable for obtaining such high temperatures, it is the object of the present invention to provide a method of preparing greases with the herein defined ureido compound thickener which can be employed by grease manufacturers who do not have equipment suitable for high temperature operations. Another object of the invention is to provide a low temperature method of preparing greases made with the herein defined ureido compound thickener.

The present invention is concerned particularly with the preparation of lubricating greases in which the lubricating oil vehicle is thickened to the desired consistency with a ureido compound having the general formula

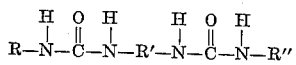

where R and R″ are the same or different abietyl radicals selected from the group consisting of a dehydroabietyl radical, a dihydroabietyl radical, and tetrahydroabietyl radical and mixtures thereof and R′ is an alkylene radical or substituted alkylene radical of from 1 to about 30 carbon atoms or an arylene radical or a substituted arylene radical. The radicals R, R′ and R″ can contain substitutents such as, for example, alkyl, alkoxy, cyano, aryl, hydroxy, carboxy, halogen, nitro and other substituent group. The alkylene radical can be straight and/or branched chain, and the arylene radicals can be mononuclear or polynuclear such as phenylene, biphenylene, naphthylene, anthrylene and phenanthrylene radicals. The terms "alkylene and arylene radicals" as used herein and in the appended claims include substituted alkylene radicals and substituted arylene radicals.

The general structural formula of the above-named radicals are:

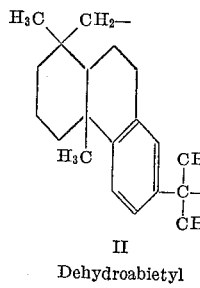

II
Dehydroabietyl

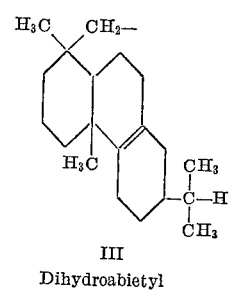

III
Dihydroabietyl

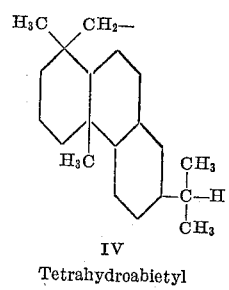

IV
Tetrahydroabietyl

The ureido compound can be prepared by heating a mixture of an abietyl amine, such as hereinafter named, and a polyisocyanate in the equivalent weight ratio of 1:1, at a temperature within the range of room temperature (about 70° F.) to about 450° F.

Examples of such abietyl amines, i.e. aliphatic amines attached to an alicyclic structure, which can be used in the preparation of the above-described ureido compounds are dehydroabietyl amine, dihydroabietyl amine and tetrahydroabietyl amine or mixtures of such amines. A particularly well suited amine is a product marketed by Hercules Powder Company as "Rosin Amine D." This product is prepared by the catalytic hydrogenation of "Rosin Nitrile D" prepared by the action at elevated temperatures of ammonia on hydrogenated rosin. Distilled and undistilled grades are available as "Amine 750" and "Amine 751." The "Rosin Amine D" is a mixture of abietyl amines in the following approximate proportion:

| | "Rosin Amine D," percent |
|---|---|
| Dehydroabietyl amine | 60 |
| Dihydroabietyl amine | 30 |
| Tetrahydroabietyl amine | 10 |

Examples of suitable polyisocyanates are tolylene diisocyanate; p,p′-diisocyanate biphenyl; 1,4-diisocyanatobenzene; p,p′-diisocyanato-diphenylmethane; 1,6-diisocyanato-hexane; 1,12-diisocyanato-dodecane; 1,3,5-benzenetriisocyanate; naphthylene diisocyanate; bitolylene diisocyanate; tri-p-isocyanato-phenylmethane; etc.

The following is illustrative of the apparent reaction which takes place

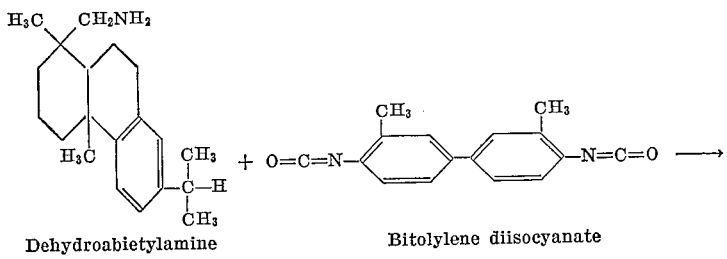

Dehydroabietylamine         Bitolylene diisocyanate

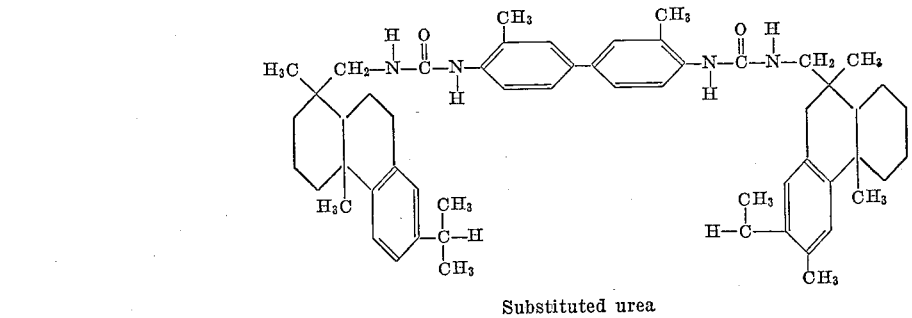

Substituted urea

The ureido compound thickener used in the preparation of the lubricating grease is preferably used in the form of a thickener concentrate of from about 25% to about 45% in the lubricating oil vehicle. The following examples illustrate methods of preparing such thickener concentrates:

*Preparation I.*—To 2020 grams of 21% solution of bitolylene diisocyanate in a solvent extracted SAE-10 mineral oil, at a temperature of about 200° F. were added 2540 grams of a 37.5% solution of dehydroabietyl amine in a solvent extracted SAE-10 mineral oil maintained at room temperature (about 72° F.), and the mixture passed through a colloid mill, or a Votator. The resultant product was a 30% concentrate of the ureido compound in the SAE-10 mineral oil base.

*Preparation II.*—A 25% solution of bitolylene in a solvent extracted SAE-10 base mineral oil was prepared by heating the components to 200° F., and a 75% solution of "Rosin Amine D," supra, in a solvent extracted SAE-10 base mineral oil was prepared by mixing at about room temperature. The isocyanate solution at a temperature of 160–190° F., and the amine solution at a temperature of 70–100° F., were then rapidly mixed in a mixing chamber, and before precipitation of the reaction product could occur the mixture was passed through a spray nozzle and sprayed into the top of a spray tower. Precipitation of the reaction product occurred as the sprayed droplets fell through the spray tower. The precipitated thickener concentrate, collected in a receiver at the bottom of the spray tower, was removed from the tower and allowed to cool to ambient room temperature. The thickener concentrate, containing about 45% of the isocyanate-amine reaction product was a pale yellow granular solid having the appearance of light yellow sugar.

The so-called "spray method" of Preparation II is fully described and claimed in U.S. Patent 2,925,387 issued to T. Traise, W. Hayne, and K. Bunting.

In accordance with the present invention, lubricating greases comprising a lubricating oil thickened with from about 2% to about 30%, preferably from about 5% to about 20% of the herein described ureido compound is readily prepared by charging to steam kettle a portion, preferably one-half of the required amount of the lubricating oil, all of the required ureido compound thickener and water, preferably 20–30% of the weight of the ureido compound thickener, heating the mixture to a maximum temperature of about 325° F., removing the water, to substantially dehydrate the resultant grease product, grading in the remaining lubricating oil to obtain a grease product of the desired consistency and homogenizing the product by passage through a colloid mill. The grease is then ready for filling. This process can be carried out in an open steam kettle or in a pressure steam kettle.

When the pressure steam kettle method is used, all of the required ureido compound thickener, water in an amount of about 20–25% of the weight of the thickener, and about one-half of the required amount of the lubricating oil are charged to the pressure steam kettle. The kettle is then sealed and heated to a maximum temperature of about 325° F. to maintain a maximum internal pressure of from about 65 to about 90 pounds per square inch for a period of from about 10 minutes to about 60 minutes, desirably 20 to 40 minutes, preferably about 30 minutes. The kettle is then vented over a period of about 10–30 minutes to release the pressure and remove the water, the kettle opened and the remaining portion of the lubricating oil graded in. The mix is then passed through a colloid mill and filled.

In the open steam kettle procedure, the required amount of water is added in two stages. An initial amount of water about 15% of the weight of the ureido compound is added to the mixture containing all of the ureido compound and one-half the required amount of the lubricating oil at about 175° F. and an additional amount of water equivalent to about one-half (about 7.5% of the ureido compound) of the initial quantity used is added at a temperature of about 230° F. Heating is continued to a maximum temperature of about 325° F. at a rapid rate to remove water as quickly as possible without excessive foaming, to substantially dehydrate the mixture, and the mixture maintained at about 325° F. for a period of from about 10 minutes to about 60 minutes. The remaining portion of the lubricating oil is graded in. The grease product is then homogenized in a colloid mill and filled.

Prior to passing the steam kettle mix through a colloid mill, such additives as desired are incorporated in the mix.

The steam kettle process of this invention is most useful in the preparation of lubricating greases from hydrocarbon lubricating oils such as a petroleum lubricating oil, mineral lubricating oil in the lubricating oil viscosity range, i.e. from about 50 SSU at 100° F. to about 300 SSU at 210° F.; synthetic hydrocarbon lubricating oils resulting from the polymerization of unsaturated hydrocarbons; solvent extracted base petroleum oil, or solvent extracted mineral base oil obtained by extracting with phenol, furfural, B,B'-dichlorodiethylether (chlorex), liquid SO$_2$, nitrobenzene, etc.; and mixtures of such oils. While lubricating greases can be prepared by the process of this invention from other oleaginous oils within the lubricating oil viscosity range such as high molecular weight polyoxyalkylene compounds, i.e. polyalkylene glycols and esters thereof, and aliphatic diesters of dicarboxylic acids such as the butyl, hexyl, 2-ethylhexyl, decyl, lauryl, etc., esters of sebacic acid, adipic acid, azeleic acid, etc., or polyfluoro derivatives of organic compounds, particularly hydrocarbons, and dibasic acid esters of $$H(CF_2)nCH_2OH$$

in the lubricating oil viscosity range, or esters of aliphatic carboxylic acids and polyhydric alcohols, e.g. trimethylolpropane pelargonate, pentaerythritol hexanoate; these oleaginous vehicles with the ureido compound thickener usually set up at temperatures in the range of from 220 to 320° F. Hence the process of this invention is most useful for the preparation of lubricating greases from lubricating oils thickened with an ureido compound as hereinbefore defined which are known to set up at temperatures above 350° F. when heated by prior art methods.

That the steam kettle process of this invention is capable of thickening or setting up of the lubricating oil-ureido compound mixture at temperatures below those previously reported is believed to be a result of the presence of water during the heating. The use of air pressure produced excessive oxidation, poor yield and dark, soft grease. Heating the mixture to 325° F. in a closed kettle under a pressure of 60 to 90 p.s.i.g. imposed by nitrogen on the other hand did eliminate oxidation and produce a grease of satisfactory color, but did not produce a satisfactory grease yield because the dispersion was poor. The use of water either in the open kettle or closed kettle embodiments of this invention, on the other hand, results in good grease yield, well dispersed grease, no thickener agglomerates on the apparatus surfaces and also provides grease of better leakage characteristics at the same consistency than produced at higher temperatures, i.e. 350° F. and above.

The following examples are illustrative of the preparation of lubricating greases in accordance with the present invention:

EXAMPLE I

To a jacketed pressure kettle gallon heated with 100 p.s.i.g. steam fitted with an internal stirrer there are charged:

Solvent extracted SAE-10 base oil_____pounds__ 3.0
Solvent extracted SAE-40 base oil_____do____ 11.0
UT-50 * _____do____ 6.0
Water _____milliliters__ 600

* 50% ureido compound from bitolylene diisocyanate and "Rosin Amine D" and 50% solvent extracted SAE-10 oil.

The kettle is closed, the internal stirrer started and the kettle is heated with 100 p.s.i.g. steam. In about 70 minutes the internal pressure in the kettle is 64 p.s.i.g. and reaches a maximum of 67 p.s.i.g. The kettle contents are held at 67 p.s.i.g. internal pressure, about 325 to 330° F., for 30 minutes. Thereafter the pressure is vented to atmospheric pressure slowly, about 55 minutes, the steam is shut off and the kettle opened. The kettle contents at 320° F. appear soft and mealy. While grading in 10 pounds of solvent extracted SAE-40 oil over 35 minutes to prepare a grease with 10% ureido thickener, the temperature of the resulting mixture drops to 260° F. This mixture is stirred for an additional 5 minutes and 5 pounds (sample I) are removed for milling in a colloid mill. The remainder of the kettle contents are heated to 390 to 395° F. and 5 pounds (sample 2) are removed for colloid milling. Grease sample 1 and grease sample 2 compare as follows:

*Table I*

| Grease Sample | Penetration | | Leakage, percent | Drop Point, ° F. |
|---|---|---|---|---|
| | Unworked | Worked | | |
| 1 | 264 | 273 | 0 | 467 |
| 2 | 223 | 226 | 0 | 488 |

From the data in Table I, it will be observed that grease sample 1, prepared in accordance with this invention, compares favorably with grease sample 2 obtained by heating to the higher temperatures previously thought to be required.

As hereinafter employed "UT-50" is used to indicate the concentrate of ureido thickener defined in Example I.

EXAMPLE II

In an open-gallon stirred kettle with a steam heated jacket, there are mixed together at ambient room temperature 3 pounds solvent extracted SAE-10 oil and 3 pounds UT-50. This mixture is heated with steam in the jacket to 175° F. and 200 ml. of water are added. Heating with steam and stirring are continued. Water is boiled out as the contents of the kettle are heated to 235° F. at which point an additional 100 ml. of water are added. The kettle contents are stirred and heated as rapidly as possible with full pressure, 100 p.s.i.g., steam in the jacket of the kettle. About 15 minutes after adding the last portion of water (mixture at 273° F.), grading in 9 pounds of solvent extracted SAE-40 oil is accomplished in 10 minutes to prepare a grease with 10% ureido thickener. The resulting mixture is at 300° F. and reaches 325° F. in 10 minutes after the solvent extracted SAE-40 oil is added. The mixture has a fine grain appearance. No large agglomerates are observed. The grease composition thickens after being held at 325° F. for 10 minutes. Three 5 pound portions are taken as follows: Sample A is taken after about 30 minutes at 325° F., sample B is taken after 60 minutes at 325° F., and sample C is taken after 120 minutes at 325° F. Each grease sample is milled. Evaluation data for these three open kettle grease samples are shown in Table II.

*Table II*

| Grease Sample | Penetration | | Leakage, percent | Drop Point, ° F. |
|---|---|---|---|---|
| | Unworked | Worked | | |
| A | 321 | 334 | 0 | 483 |
| B | 292 | 295 | 0 | 485 |
| C | 293 | 293 | 0 | 480 |

The data in Table II demonstrates that holding the grease composition at 325° F. for more than 60 minutes does not change its characteristics while holding at 325° F. for less than 60 minutes, 30 minutes, produces a satisfactory grease although slightly softer.

EXAMPLE III

To a pressure kettle as described in Example I there are charged and mixed together at ambient room temperature until the kettle is sealed:

No. 3 bright stock oil_____pounds__ 3.0
Solvent extracted SAE-40 oil_____do____ 7.0
UT-50 (series 39-245)_____do____ 6.0
Water _____milliliters__ 600

As soon as the kettle is sealed full, 100 p.s.i.g. steam is charged to the jacket. In about 85 minutes the pressure in the kettle is 65 p.s.i.g., about 320° F. The kettle contents are held at 65 p.s.i.g. and about 320° F. for 30 minutes and thereafter the kettle is vented to ambient atmospheric pressure over a period of about 50 minutes.

The kettle is then opened. The steam to the jacket is shut off and 5 pounds each of solvent extracted SAE-40 oil and No. 3 bright stock oil are graded in over about 35 minutes to prepare a grease with 11.5% ureido thickener. The temperature of the resulting mix is 250° F. A 5 pound sample, sample 3, is taken from the kettle and put through a colloid mill. The remainder of the grease in the kettle is heated to and held at 390–395° F. for 30 minutes. Additional thickening is observed. A 5 pound sample, sample 4, is taken and put through a colloid mill. To the remaining grease 5 pounds of additional No. 3 bright stock oil is added and 5 pounds of this mixture, sample 5, is taken and put through a colloid mill. Evaluation of these grease samples are as follows:

*Table III*

| Grease Sample | Penetration | | | | Leakage, percent | Drop Point, ° F. |
|---|---|---|---|---|---|---|
| | Unworked | Worked | 60,000 | 100,000 | | |
| 3 | 298 | 307 | 317 | 321 | 0 | 482 |
| 4 | 237 | 264 | | | 0 | |
| 5 | 289 | 314 | | | 0.7 | |

Grease sample 3, prepared in accordance with this invention has satisfactory drop point property and the penetration and leakage compared quite favorably to the penetrations and leakage of grease samples 4 and 5 (prepared at the prior art high temperature).

EXAMPLE IV

To a jacketed kettle as described in Example I, there are charged and stirred at ambient room temperature until the kettle is sealed:

Unextracted SAE-50 MC oil _____ pounds __ 7
Solvent extracted SAE-40 oil _____ do ____ 7
UT-50 (series 39-245) _____ do ____ 6
Water _____ milliliters __ 600

After sealing the kettle full 100 p.s.i.g. steam is charged to the jacket. The kettle contents are held at 320–325° F. for 30 minutes and the pressure, 65 to 67 pounds, is then vented slowly, over about 190 minutes. The kettle is open, grading in of 5 pounds of solvent extracted SAE-40 oil and 5 pounds of unextracted SAE-50 MC oil to prepare a grease of 10% ureido thickener is accomplished in 30 minutes. The resulting grease is at 320° F. A 5 pound sample, sample 6, is taken and put through a colloid mill. The remainder of the grease is heated to and held at 390–395° F. for 30 minutes. Additional thickening is observed. A 5 pound sample, sample 7, is taken and put through a colloid mill. The remaining heat treated (390–395° F.) grease is cooled to 330° F. grading in 2.5 pounds of solvent extracted SAE-40 oil and 2.5 pounds of unextracted SAE-50 MC oil is accomplished in about 10 minutes and a 5 pound sample, sample 8 (8% thickener) of the resulting grease is taken and put through a colloid mill. Evaluations of these grease samples are shown in Table IV.

*Table IV*

| Grease Sample | Penetration | | Leakage, percent | Drop Point, ° F. |
|---|---|---|---|---|
| | Unworked | Worked | | |
| 6 | 280 | 296 | 0 | 479 |
| 7 | 245 | 260 | 0 | |
| 8 | 287 | 297 | 1.4 | |

These greases, samples 6, 7 and 8 possess a somewhat more stringy structure with the heavier oil base. Grease sample 6, prepared in accordance with this invention, is a satisfactory grease as the data in Table IV illustrates and as compared to greases, samples 7 and 8, prepared at the higher prior art thickening temperatures of 390–395° F.

EXAMPLE V

To a sealable kettle as described in Example I, there are charged and stirred at ambient room temperature until the kettle is sealed:

Solvent extracted SAE-10 oil _____ pounds __ 3
Solvent extracted SAE-40 oil _____ do ____ 11
UT-50 (series 39-245) _____ do ____ 6
Water _____ milliliters __ 600

The kettle is sealed and full 100 pound steam charged to the jacket. The kettle contents are rapidly stirred and reach 320–325° F. at a pressure of 65 p.s.i.g. in about 85 minutes. The kettle contents are held at 65 p.s.i.g. and 320–325° F. for about 35 minutes. Thereafter the internal kettle pressure is vented to an open can in about 5 minutes. Carried over with the steam and caught in the open can trap are 2.5 pounds of grease. Grading in 8.7 pounds of solvent extracted SAE-40 oil is accomplished in 25 minutes. A 5 pound sample, sample 9 (10% thickener), is taken and put through a colloid mill. The remaining grease is held at 320° F. for 120 minutes, a 5 pound sample, sample 10, is taken and put through a colloid mill. The remaining grease is heat treated at 400° F. for 30 minutes, cooled to 240° F. and a 5 pound sample, sample 11, of this heat treated grease is taken and put through a colloid mill. Evaluation of these grease samples is shown in Table V.

*Table V*

| Grease Sample | Penetration | | | Leakage, Percent |
|---|---|---|---|---|
| | Unworked | Worked | 91,500 | |
| 9 | 254 | 298 | 313 | 1.2 |
| 9 Remilled | 296 | 299 | | |
| 10 | 255 | 290 | 306 | 1.1 |
| 10 Remilled | 294 | 299 | | |
| 11 | 226 | 232 | | 0.5 |

Rapid venting of water vapor pressure produces a satisfactory grease somewhat softer than that produced by slow venting as in Example I.

In the foregoing general evaluations, the "penetrations" reported are those measured at 77±1° F. by ASTM Method D217–52T. In these penetrations "unworked" designates grease which has received only minimum handling in transfer from can (after colloid milling) to test apparatus, and "worked" designates grease brought to 77±1° F. and subjected to 60 strokes in a standard grease worker except where numbers higher than 60 are separately indicated such as 60,000; 100,000 or 91,500, which indicate said higher number of strokes at 77±1° F. The value "leakage" is the percent by weight oil loss determined on a 10 gram grease sample with a 60 mesh cone according to ANG-3 test. "Drop point" in ° F. is determined by ASTM Method D566–42.

An evaluation of mechanical stability of greases can be determined under conditons simulating those encountered in use with roller bearings. The apparatus and method used is that described in the Institute Spokesman, vol. 6, No. 12, pp. 1–4 (1943). Briefly, the test involves determination of micropenetration of grease at 77° F. after being worked for 60 strokes, transferring about 100 grams of the worked grease to the "Precision" Shell Roller Tester and running the machine for 4 hours during which time the grease is kneaded. At the end of the time the grease has been kneaded, micropenetration at 77° F. of the grease is determined. Usually an evaluation of the grease is made by a rating scale wherein the percentage of the difference (increase or decrease) between the penetration initial reading and final reading is compared to a scale as follows:

Percent change—increase or decrease: Rating
0 to 10% _____ Excellent
10.1 to 25.0% _____ Good
25.1 to 60% _____ Fair
Over 60.1% _____ Poor Greases containing ureido thickeners, prepared at the prior art high temperature (390–400° F.), are known to be of "excellent" rating according to the above scale when evaluated by the 4 hour kneading test. It has been shown hereinbefore that ureido thickened greases, prepared in accordance with this invention, are comparable to greases prepared at the prior art higher temperatures. To show that the greases prepared in accordance with this invention have outstanding mechanical stability, the results of Roll Tests made of 24 and 96 hours kneading are shown in Table VI. The sample designations are keyed to those used in the foregoing examples.

*Table VI*

RATING—ROLL STABILITY TESTS

| Grease Sample | Penetrations | | | Percent Change | | Rating | |
|---|---|---|---|---|---|---|---|
| | Initial | 24 hour | 96 hour | 24 hour | 96 hour | 24 hour | 96 hour |
| 1 | 273 | 296 | 304 | 8.5 | 11.4 | Excellent | Good. |
| C | 293 | 329 | 320 | 12.3 | 9.2 | Good | Excellent. |
| Control | 285 | 298 | 304 | 4.5 | 6.7 | Excellent | Do. |
| 3 | 283 | 312 | 300 | 10.5 | 6.0 | Good | Do. |

Grease sample "control" is similar to sample 3 except that control was thickened at 395° F. without addition of water. Both "control" and sample 3 had the same thickener, oil base, and same thickener concentration, 8%.

Grease products containing hydrocarbon oil bases other than those described in the foregoing examples can be prepared by the method of this invention to produce grease products substantially equivalent to those prepared at the higher temperatures of the prior art. Also other ureido compound thickeners can be employed in the preparation of greases by the process of this invention. For example, in place of the ureido compound employed in Examples I to VI, there can be used per se or concentrates of ureido compounds derived from the hereinbefore named polyisocyanates and abietyl amines.

Grease products which can be prepared by the process of this invention can contain one or more well known additives or addition agents to impart various desired properties thereto such as, by way of example, antioxidants, extreme pressure agents, corrosion inhibitors, anti-leak agents, anti-foam agents, mineral lubricants such as graphite, molybdenum sulfide, etc.

The following are illustrative examples of grease products containing additives which impart "heavy duty" properties to the grease. The ingredients shown are the weight percent employed to make the grease product. Instead of showing the amount of ureido compound employed per se or concentrate, the ingredients employed to make the ureido compound are shown. All ingredient percentages are based on 100 parts of the final grease product.

| | Weight Percent | | |
|---|---|---|---|
| Dehydroabietyl Amine | 2.45 | 3.15 | 3.85 |
| Bitolylene Diisocyanate | 1.05 | 1.35 | 1.65 |
| Mineral Oil Base | 86.9 | 85.9 | 84.9 |
| Lead Tallate | 6.5 | 6.5 | 6.5 |
| Sulfurized Sperm Oil | 1.5 | 1.5 | 1.5 |
| Chlorinated Hydrocarbon | 1.5 | 1.5 | 1.5 |
| Dodecyl Hexasulfide | 0.1 | 0.1 | 0.1 |

Greases of the type herein described, particularly embodying hydrocarbon lubricating oils, are useful under conditions encountered in normal automotive and industrial uses, and are suitable for fulfilling the requirements of multi-purpose greases.

Percentages and parts given herein and in the appended claims are by weight, unless otherwise stated.

Although the present invention has been described with reference to specific embodiments thereof, the invention is not limited thereto, but includes within its scope such modifications and variations as come within the scope and spirit of the appended claims.

What is claimed is:

1. The method of preparing a lubricating grease comprising a lubricating oil thickener with from about 2% to about 30% of a ureido compound having the general formula

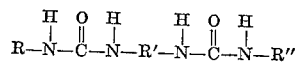

in which R and R″ are abietyl radicals selected from the group consisting of a dehydroabietyl radical, a dihydroabietyl radical, a tetrahydroabietyl radical and mixtures thereof and R′ is an organic radical selected from the group consisting of an alkylene radical of from 1 to about 30 carbon atoms, and an arylene radical, which method consists essentially of mixing in a steam kettle from one-third to two-thirds of the required lubricating oil, all of the required ureido compound thickener to provide from 2 to 30 percent thereof in the final product, and water in an amount of about 20–30% of the weight of said ureido compound thickener, heating the mixture to a maximum temperature of about 325° F., removing water from the heated mixture, grading in the remaining amount of required lubricating oil and homogenizing the resultant product in a colloid mill.

2. The method of preparing a lubricating grease comprising a lubricating oil thickened with from about 2% to about 30% of a ureido compound having the general formula

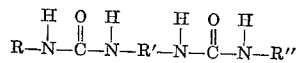

in which R and R″ are abietyl radicals selected from the group consisting of a dehydroabietyl radical, a dihydroabietyl radical, a tetrahydroabietyl radical and mixtures thereof and R′ is an organic radical selected from the group consisting of an alkylene radical of from 1 to about 30 carbon atoms, and an arylene radical, which method consists essentially of mixing in a pressure steam kettle from one-third to two-thirds of the required lubricating oil, all of the required ureido compound thickener to provide from 2 to 30 percent thereof in the finished product, and water in amount of about 20–30% of the weight of said ureido compound thickener, sealing the steam kettle, heating the contents of the kettle to a maximum temperature of about 325° F. to maintain a maximum internal pressure in said kettle of from about 65 to about 90 pounds per square inch for a period of from about 10 minutes to about 60 minutes, venting the kettle over a period of about 10–30 minutes to release the pressure and remove the water, grading in the remaining amount of the required lubricating oil and homogenizing the resultant grease product in a colloid mill.

3. The method of preparing a lubricating grease comprising a lubricating oil thickened with from about 2% to about 30% of a ureido compound having the general formula

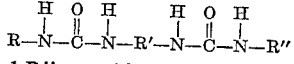

in which R and R″ are abietyl radicals selected from the group consisting of a dehydroabietyl radical, a dihydroabietyl radical, a tetrahydroabietyl radical and mixtures thereof and R′ is an organic radical selected from the group consisting of an alkylene radical of from 1 to about 30 carbon atoms, and an arylene radical, which method consists essentially of heating in an open steam kettle from one-third to two-thirds of the required lubricating oil, all of the required ureido compound thickener to provide from 2 to 30 percent thereof in the finished product, adding water in an amount of about 10–15% of the weight of said ureido compound thickener, at a temperature of about 175° F., adding additional water in an amount of about one-half of that initially added, at a temperature of about 230° F., rapidly heating the mixture in said steam kettle to a temperature of about 325° F. to remove water and substantially dehydrate the mixture, maintaining the substantially dehydrated mixture at a temperature of about 325° F. for a period of from about 10 minutes to about 60 minutes, and then homogenizing the resultant product in a colloid mill.

4. The method of preparing a lubricating grease comprising a lubricating oil thickened with from 2% to about 30% of the ureido compound obtained from bitolylene diisocyanate and dehydroabietyl amine reacted in the equivalent weight ratio of 1:1 at 70 to 450° F., which method consists essentially of mixing in a steam kettle from one-third to two-thirds of the required lubricating oil, all of the required ureido compound thickener, and water in an amount of about 20–30%, of the weight of said ureido compound thickener to provide from 2 to 30 percent thereof in the finished product, heating the mixture to a maximum temperature of about 325° F., removing water from the heated mixture, grading in the remaining amount of required lubricating oil and homogenizing the resultant product in a colloid mill.

5. The method of preparing a lubricating grease comprising a lubricating oil thickened with from 2% to about 30% of the ureido compound obtained from bitolylene diisocyanate and dehydroabietyl amine reacted in the equivalent weight ratio of 1:1 at 70 to 450° F., which method consists essentially of mixing in a pressure steam kettle from one-third to two-thirds of the required lubricating oil, all of the required ureido compound thickener to provide from 2 to 30 percent thereof in the finished product, and water in amount of about 20–30% of the weight of said ureido compound thickener, sealing the steam kettle, heating the contents of the kettle to a maximum temperature of about 325° F. to maintain a maximum internal pressure in said kettle of from about 65 to about 90 pounds per square inch for a period of from about 20 minutes to about 40 minutes, venting the kettle over a period of about 15–30 minutes to release the pressure and remove the water, grading in the remaining amount of the required lubricating oil and homogenizing the resultant grease product in a colloid mill.

6. The method of preparing a lubricating grease comprising a lubricating oil thickened with from 2% to about 30% of the ureido compound obtained from bitolylene diisocyanate and dehydroabietyl amine reacted in the equivalent weight ratio 1:1 at 70 to 450° F., which method consists essentially of heating in an open steam kettle from one-third to two-thirds of the required lubricating oil, all of the required ureido compound thickener to provide from 2 to 30 percent thereof in the finished product, adding water in an amount of about 10–15% of the weight of said ureido compound thickener, at a temperature of about 175° F., adding additional water in an amount of about one-half of that initially added, at a temperature of about 230° F., rapidly heating the mixture in said steam kettle to a temperature of about 325° F., to remove water and substantially dehydrate the mixture, maintaining the substantially dehydrated mixture at a temperature of about 325° F. for a period of from about 10 minutes to about 60 minutes, and then homogenizing the resultant product in a colloid mill.

References Cited in the file of this patent

UNITED STATES PATENTS 3,015,625     Rosscup et al.     Jan. 2, 1962